United States Patent
Held

(10) Patent No.: US 8,688,730 B2
(45) Date of Patent: Apr. 1, 2014

(54) DATA ALLOCATION IDENTIFICATION

(75) Inventor: Dominik Held, Walldorf (DE)

(73) Assignee: SAP AG, Walldorf (DE)

( * ) Notice: Subject to any disclaimer, the term of this patent is extended or adjusted under 35 U.S.C. 154(b) by 412 days.

(21) Appl. No.: 13/270,503

(22) Filed: Oct. 11, 2011

(65) Prior Publication Data

US 2012/0096044 A1    Apr. 19, 2012

(30) Foreign Application Priority Data

Oct. 14, 2010   (EP) .................................. 10013642

(51) Int. Cl.
   *G06F 17/30*   (2006.01)
(52) U.S. Cl.
   USPC ........... 707/769; 707/706; 707/722; 707/713; 707/736; 707/759
(58) Field of Classification Search
   CPC ................................................ G06F 17/30731
   USPC .......... 707/706, 722, 713, 736, 790, 769, 759
   See application file for complete search history.

(56) References Cited

U.S. PATENT DOCUMENTS

| | | | |
|---|---|---|---|
| 2009/0006467 A1* | 1/2009 | Visscher | 707/103 Y |
| 2009/0172035 A1* | 7/2009 | Lessing et al. | 707/104.1 |
| 2009/0182789 A1* | 7/2009 | Sandorfi et al. | 707/204 |
| 2011/0307654 A1* | 12/2011 | Ma et al. | 711/105 |

* cited by examiner

*Primary Examiner* — Sana Al Hashemi

(74) *Attorney, Agent, or Firm* — Schwegman, Lundberg & Woessner, P.A.

(57) ABSTRACT

Various embodiments illustrated and described herein pertain to at least one of systems, methods, databases, and instructions stored on computer-readable mediums for data allocation identification. One method according to some embodiments includes determining a database allocation of an entity and identifying a domain directly associated with the entity. The method may further include determining at least one header table field directly associated with the entity by identifying a directly associated type definition linked to the directly associated domain, wherein the directly associated type definition refers to the header table field, wherein each header table field is in a corresponding header table. This, and other embodiments, are illustrated and describe in detail herein.

15 Claims, 3 Drawing Sheets

DATA ALLOCATION IDENTIFICATION

RELATED APPLICATION

The present patent application claims the priority benefit of the filing date of European Application (EPO) No. 10013642.3 filed Oct. 14, 2010, the entire content of which is incorporated herein by reference.

BACKGROUND

The automated determination of a database allocation of an entity can be used in a variety of data storage related projects. In addition, globalization may cause the consolidation of multiple systems. Specifically, systems and applications that can coexist on a single database system are merged to save costs in terms of administration, backups, maintenance, and staff. There is an ongoing trend in information technology to have centralized systems which are used from all company locations worldwide. With the growing number of systems, a lack of transparency of data allocation (i.e. data storage allocation) becomes a problem. For example, it may be difficult to determine how much data stored on a global system is associated with a particular country.

SUMMARY

According to an aspect, a computer implemented method for determining a database allocation of an entity is provided. The method may comprise identifying a domain directly associated with the entity. The method may further comprise determining at least one header table field directly associated with the entity by identifying a directly associated type definition linked to the directly associated domain, wherein the directly associated type definition refers to the header table field, wherein each header table field is in a corresponding header table.

The method may further comprise determining at least one detail table field indirectly associated with the entity, wherein each detail table field is in a corresponding detail table. Determining the detail table field may comprise determining a linking field that is in the same header table as the header table field. Determining the detail table field may further comprise identifying a first indirectly associated type definition indirectly associated with the entity, wherein the first indirectly associated type definition refers to the linking field, wherein the first indirectly associated type definition is linked to an indirectly associated domain that is not directly associated with the entity. Determining the detail table field may further comprise determining, using the first indirectly associated type definition, the detail table field, wherein the first indirectly associated type definition refers to the detail table field. The method may further comprise calculating the number of records allocated to the entity, each calculated record including the determined header table field or the determined detail table field.

Each domain may define a value range and each type definition may be linked to a corresponding domain that specifies the value range of the corresponding domain for each field that refers to the type definition.

The database allocation of an entity may also be referred to as the database storage allocation of the entity.

The linking field may be in the same record or row of the header table as the determined header table field.

Determining the detail table field using the first indirectly associated type definition may further comprise determining all the detail table fields referred to by the first indirectly associated type definition.

In some cases, each header table may represent a document header, and the detail table may include detail information corresponding to the header table.

Also, it may be that each linking field in a header table is unique. Furthermore, at least one linking field in a header table may appear multiple times in the detail table.

In addition, identifying the directly associated type definition linked to the directly associated domain may further comprise identifying all the directly associated type definitions linked to the directly associated domain. Moreover, determining the header table field directly associated with the entity may comprise determining all the header table fields directly associated with the entity. Also, each determined header table field may be referred to by one of the identified directly associated type definitions.

Moreover, identifying the first indirectly associated type definition may further comprise identifying all subsequent indirectly associated type definitions linked to the indirectly associated domain. It may be that at least one of the subsequent indirectly associated type definitions does not refer to the linking field. Also, determining the at least one detail table field may comprise determining, using the first indirectly associated type definition and the subsequent indirectly associated type definitions, all the detail table fields indirectly associated with the entity. At least one of the determined detail table fields may be identical to the linking field.

Furthermore, the entity may define a category. Accordingly, the method may further comprise identifying a customizing table linked to the entity, and identifying at least one member of the category in the customizing table. Also, the header table may be linked to the identified member of the category. Determining the database allocation of the entity may comprise determining the database allocation of the identified member.

More specifically, the header table field may contain an identifier of the identified member. For example, when the member identifier for a specific purchasing organization is 0001, 0001 identifies the member in the customizing table and the content of the header table field is 0001.

Identifying the at least one member of the category may comprise identifying all the members of the category in the customizing table. Determining the database allocation of the member may further comprise determining the database allocation of all the identified members.

Also, each directly associated header table field may be linked to one of the identified members. In addition, identifying the at least one member may comprise identifying all the members of the category in the customizing table. Also, each directly associated header table field may be linked to one of the identified members. Furthermore, each indirectly associated detail table field may be linked to one of the identified members via the header table field used to determine the corresponding indirectly associated detail field.

Moreover, calculating the number of records allocated to the entity may comprise calculating the number of records linked to each member, the number of calculated records comprising:
 the number of records in each header table including a header table field linked to the member;
 the number of records in each detail table including a detail table field linked to the member.

The method may further comprise generating a histogram for the table, wherein the calculated number of records for each member is represented by a corresponding bin in the histogram.

In some cases, determining the linking field comprises evaluating the primary key of the corresponding header table.

The linking field may have an integer data type and a length of more than ten digits. It is possible that the directly associated domain is not linked to any type definition referred to by one of the determined detail table fields.

It may be that the linking field is in (i.e. part of) the primary key of the corresponding header table, and that the linking field is in the primary key of the corresponding detail table.

Furthermore, it may be that the directly associated domain is linked to the entity in a data dictionary. It is possible that the indirectly associated domain is not linked to the entity in the data dictionary.

Moreover, the indirectly associated domain may be indirectly associated with the entity via the first indirectly associated type definition. The subsequent indirectly associated type definitions may be indirectly associated with the entity via a link between the subsequent indirectly associated type definition and one of the determined linking fields, or a link between the indirectly subsequent indirectly associated type definition and the indirectly associated domain.

Also, for each header table and each detail table the method may further comprise determining the ratio of the calculated number of records in the corresponding table to the total number of records in the corresponding table.

The method may further comprise executing a join operation on one directly associated header table and one indirectly associated detail table. The method may further comprise determining, via the join operation:
  all records in the directly associated header table linked to the identified member,
  all the linking fields in the directly associated header table,
  for each determined linking field, the number of records in the indirectly associated detail table with a detail table field that is linked to the corresponding linking field.

The method may further comprise verifying the calculated number of detail table fields against the detail table fields determined via the join operation.

A particular detail table field can be linked to a linking field by referring to an indirectly associated type definition that is also referred to by the linking field. In other words, the link between the linking field and the detail table field can be implemented through references to the indirectly associated type definition.

Each linking field determined via the join operation may be in the same row of the directly associated header table as one of the at least one directly associated header table fields.

According to another aspect, a database system operable to determine a database allocation of an entity is provided. The system may comprise a domain identifier operable to identify a domain of the entity. The system may further comprise a header field determiner operable to determine at least one header table field directly associated with the entity by identifying a directly associated type definition linked to the directly associated domain, wherein the directly associated type definition refers to the header table field, wherein each header table field is in a corresponding header table. The system may further comprise a detail field determiner operable to determine at least one detail table field indirectly associated with the entity, wherein each detail table field is in a corresponding detail table. The detail field determiner may be operable to determine a linking field that is in the same header table as the header table field. The detail field determiner may be further operable to identify a first indirectly associated type definition indirectly associated with the entity, wherein the first indirectly associated type definition refers to the linking field, wherein the first indirectly associated type definition is linked to an indirectly associated domain that is not directly associated with the entity. The detail field determiner may be further operable to determine, using the first indirectly associated type definition, the detail table field, wherein the first indirectly associated type definition refers to the detail table field. The system may further comprise a field calculator operable to calculate the number of records allocated to the entity, each calculated record including the determined header table field or the determined detail table field. Also, each domain may define a value range and each type definition linked to a corresponding domain may specify the value range of the corresponding domain for each field that refers to the type definition.

Advantageously, the process of determining the storage allocation of a database may be improved. In particular, the aspects described above may provide a more efficient and flexible way to determine the entities (e.g. responsible owners) associated with database data.

The subject matter described in the specification can be implemented as a method or as a system, possibly in the form of one or more computer program products. The subject matter described in the specification can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

DETAILED DESCRIPTION

Figure 1:
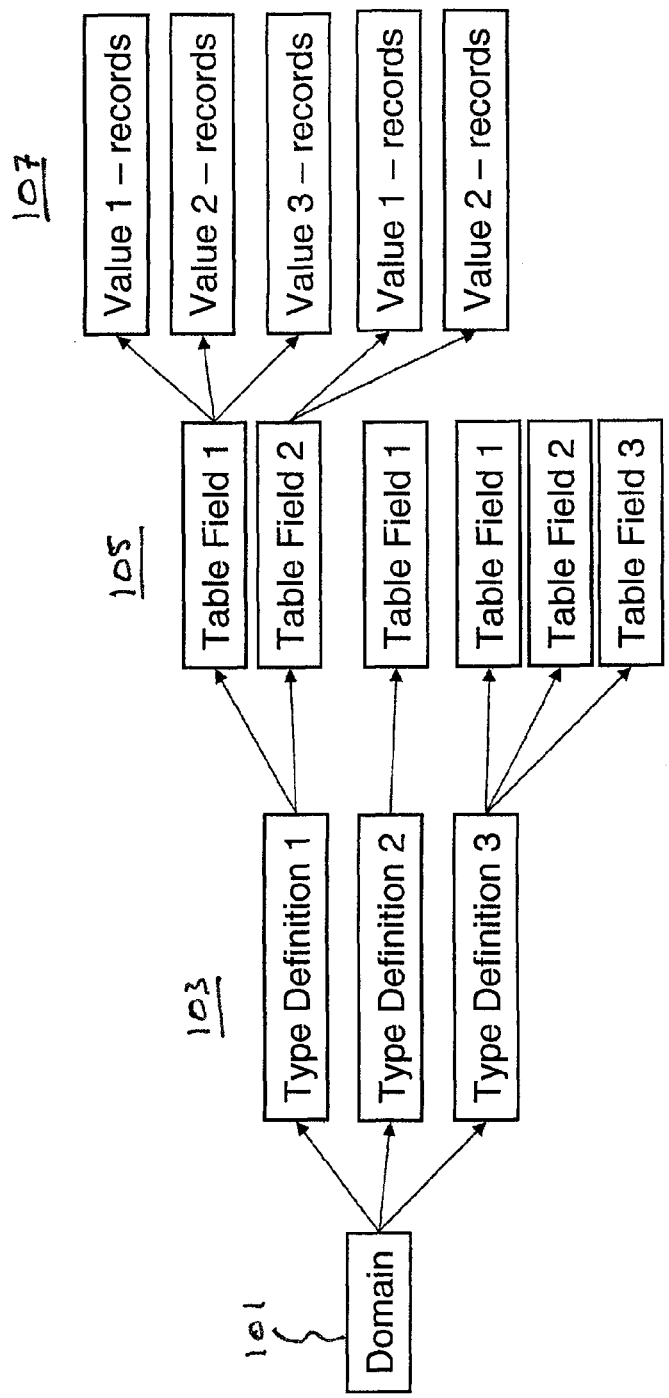
FIG. 1 depicts generic relationships in a database and a partial database allocation.

Details of one or more implementations are set forth in the exemplary drawings and description below. Other features will be apparent from the description, the drawings, and from the claims.

In the following text, a detailed description of examples will be given with reference to the drawings. It should be understood that various modifications to the examples may be made. In particular, elements of one example may be combined and used in other examples to form new examples.

The following technical terms are used in the description. The terms may refer to, but are not limited to, the following explanations.

An "entity" may be an individual user, a business unit such as a purchasing organization or a sales organization, or a subsidiary organization located in a different country than a parent organization. The entity may define a category, such as countries or purchasing organizations, and the members of the category may be individual countries or individual purchasing organizations.

An "object" may be understood in the context of object oriented programming. In particular, the object may be an instance of a class, where the class is also referred to as an object type. The object may include one or more methods, where a method is an operation that can be performed on the object and that provides access to the object's data. The object may also include one or more attributes, where each attribute contains data about the object. In addition, the object may be associated with one or more events, where an event indicates the occurrence of a status change of the object. One or more interfaces may be associated with the class, where each interface is a group of related methods.

When the object is used to implement the entity in a computer, the object may be referred to as a "business object".

A "domain" defines a value range. The domain may be assigned to at least one type definition. All table fields that refer to the type definition then have the value range defined by the domain. Thus, the relationship between a table field and the domain is defined by the type definition of the table field. In addition, table fields that refer to the type definition assigned to the domain are changed when the domain is changed. The value range of the domain can be defined by specifying a data type and a length. Furthermore, the domain can specify a number of decimal places for numeric data types. The entity may be implemented using the domain, i.e. each entity may be implemented with a corresponding domain.

A "type definition" can be used to define a data type of a table field. The type definition may also be referred to as a data element. For example, the table field may refer to the type definition. In addition, the type definition may refer to the table field. The type definition gets its technical attributes, e.g. data type and field length, from its assigned domain. Table fields that refer to the type definition may also be understood to refer to the domain assigned to the type definition. The type definition can be used to define the type of the table field, the type of a component of a structure in a table, or a row type of a table type. Information about the meaning of the table field or the structure component, and related information about documents, texts, packages, and technical characteristics can be assigned to the type definitions. The assigned information is automatically available to all table fields that refer to the type definition. In some cases, a table can only be created by using the type definitions to create the columns of the table. Each type definition can be reusable in the definition of multiple structures and multiple database tables.

A domain "directly associated" with the entity may be linked to the entity in a data dictionary. The data dictionary may be implemented as data or metadata associated with a table. Alternatively, the data dictionary may be implemented as a separate data structure linking an identifier for the domain and an identifier for the entity. The data dictionary may be implemented as a set of tables.

In order for the domain to be "linked" to the entity in the data dictionary, tables associated with the business object implementing the entity may include fields referring to type definitions having the value range defined by the domain.

A domain "indirectly associated" with the entity might not be linked to the entity in the data dictionary. Instead, the domain may be linked to a type definition that refers to a linking field, where the linking field may be related to a directly associated table field that refers to the domain directly associated with the entity. In some cases, the linking field is in the same row as the directly associated table field.

A "header table" may refer to a table which represents a document header. The header table may also be referred to as a general table or an overview table. In some cases, the header table may include summary information, information regarding relationships with other header tables, and information regarding relationships with one or more detail tables. The header table may include a definition of a relationship to the business object. In a specific example, the header table contains the header information of a business document, such as a sales order. According to the example, the header table contains information about when the sales order was created, who has created sales order, in which region etc. In the example, each record or entry in the header table includes a unique ID (i.e. a linking field such as a document number) to exactly be able to determine each document uniquely in the system.

A "detail table" may include detail information associated with the header table. The detail table may also be referred to as a line item table. The detail table may be connected to the header table via a linking field. Continuing the specific example provided above for the header table, the detail table corresponding to the sales order header table may include information such as the articles or materials that are part of the sales order. These articles or materials can be represented by one or many detail item tables which represent items belonging to a header document, in this example belonging to the same document header. The link between the detail table and the header table is provided by having a linking field with the same content in the header table and the detail table. For example, a field with the same document ID number can appear in both the header table and the detail table.

If 100 different items are order using a single sales order, the database may include one sales order in the header table, and 100 records in at least one detail table. The record in the header table and all the records in the line item table may include the same linking field (i.e. the records include a linking field with the same document number).

A "linking field" may be used to link a header table to one or more corresponding detail tables. The linking field may be implemented as a numeric field such as an identifier or a document number. The linking field may be part of the primary key of both the header table and the detail table. When the header table is connected to the detail table, the same linking field (i.e. two linking fields with the same data) may appear in both the header table and the detail table.

A "histogram" in the context of table analysis may be understood as the distribution of records based on particular criteria. Generating the histogram may involve counting the number of fields based on different selection criteria (data elements, domains) for each identified table.

An automated determination of a database allocation of an entity can be used in a variety of data storage related projects. The data storage related projects include a merger or an acquisition of a new company into an existing system, such as an SAP system. Another applicable project could be the selling of a specific business unit to an external company, which may require the deletion of all data related to the specific business unit due to legal requirements. Deleting all the data related to the business unit would first require identifying the database allocation of the business unit (i.e. the data in the database associated with or assigned to the business unit).

Moreover, a growing business, the extension of an existing business, or the creation of new business departments may require projects which focus on a projection of future data growth and the storage requirements for the data. Some projects in the context of migrating or moving data include the tasks of detecting what data is linked with the entity and how many database fields are related to the entity. These tasks can be carried out using the technical definition of the entity in a database of an enterprise resource planning system. In particular, these tasks can be performed by determining the database allocation of the entity.

Conventional approaches to determining the database allocation of the entity focus on tables only. However, in a global system, a tables-only approach may not be helpful. In particular, the data from a plurality of countries and a plurality of business units may be stored in the same table. Moreover, it may be a problem to determine how much data is allocated to a particular department if the table contains data from multiple departments. The problem is particularly acute on a large scale, such as an SAP application consisting of more than 100.000 tables.

FIG. 1 depicts a data model of relationships in a database and a partial database allocation of an entity.

In the present example, a domain 101 is directly associated with the entity. The domain 101 may be understood as an object, a technical object (i.e. an object with technical attributes) or a unique repository object (i.e. the domain is used in a repository and each domain is unique). The direct association between the domain 101 and the entity may be implemented by creating a link between the domain 101 and the entity in a data dictionary, e.g. the SAP dictionary. Also, the domain 101 may be associated with a system, e.g. a database system. In some cases, the domain 101 is linked to one or more customizing tables and the entity may define an entity category. The customizing tables linked to the domain 101 may include all the members of the entity category that are available on the system, as well as identifiers of the members and links to other information.

The entity may be a particular business unit such as a sales department, a category of business units, a country, etc.

Returning to FIG. 1, type definitions 103 are linked to the domain 101. The domain 101 is used in or assigned to the type definitions 103. The same domain can be used in multiple type definitions. The links between the domain 101 and the type definitions 103 may be understood to mean that the value range specified by the domain 101 is used in each of the type definitions 103.

Each of the type definitions 103 refers to one or more table field identifiers 105. Each of the table field identifiers 105 includes a table name and a field name. Each of the table field identifiers 105 may be understood to refer to all the fields with the corresponding field name in the table with the corresponding table name. In addition, one of the type definitions 103 can be used in a plurality of database tables and in a plurality of different fields. Each of the table fields represented by the table fields identifiers 105 may refer to one of the type definitions 103. Each field name may describe the contents of the corresponding field. In some cases, the field name contains letters, digits, and underscores, and must begin with a letter. In addition, it is possible that the length of the field name is limited to sixteen characters. The field name is not necessarily unique within the database or within a particular table.

Member identifier values 107 each include a member identifier and a number of records, depicted as "Value #" and "records" respectively. Each of the member identifier values 107 is associated with one of the table field identifiers 105, where the association is depicted with an arrow. Each member identifier identifies a member of a category defined by the entity. For example, the category may be countries and one member may be Germany, where Germany has an associated member identifier. The number of records corresponding to the associated table field identifier refers to the number of rows in the database including at least one table field associated with the table field identifier that are allocated to the member with the member identifier.

Figure 2:
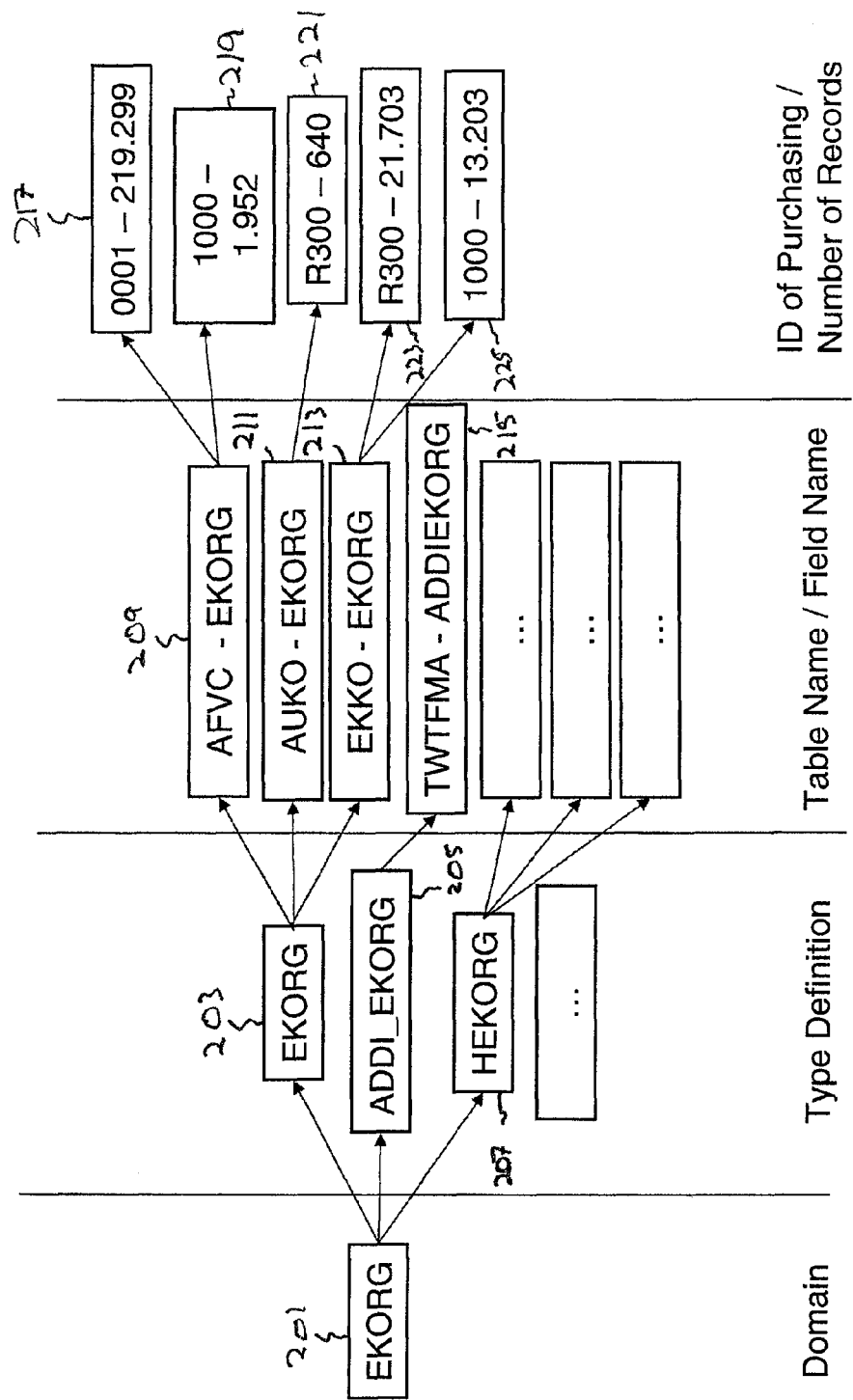
FIG. 2 depicts specific relationships in a database and a partial database allocation.

FIG. 2 depicts specific relationships in a database and a partial database allocation. In other words, FIG. 2 depicts a specific implementation of the data model shown in FIG. 1.

An EKORG domain 201 is a specific implementation of the domain 101. The EKORG domain 201 may be understood as an implementation of the domain 101 with the name EKORG, a data type of character, and a length of 4. The EKORG domain 201 may be identified because a user is interested in determining a database allocation of purchasing organizations, and a purchasing organization entity is linked to the EKORG domain 201 in the data dictionary. For example, the purchasing organization entity may be implemented as a business object and the business object may refer to tables. The tables referred to by the business object implementing the purchasing organization entity may include fields that refer to type definitions having the value range defined by the domain. Other ways of linking the purchasing organization entity to the EKORG domain 201 are also possible. For example, there may be a pointer from the purchasing organization entity to the EKORG domain 201.

As noted above, the purchasing organization entity may be implemented as a business object. Accordingly, the EKORG domain 201 may be understood to describe the business object used to implement the purchasing organization entity. In view of the link in the data dictionary, or the pointer, or a similar link, the EKORG domain 201 may be understood to be directly associated with the purchasing organization entity.

The purchasing organization entity may define a category. In the present example, the purchasing organization entity defines the category of purchasing organizations, i.e. the purchasing organization category. In addition, the purchasing organization entity may be linked to one or more customizing tables. Moreover, the EKORG domain 201 may be linked to the customizing tables. The customizing tables may include various information related to the purchasing organization entity including definitions of all purchasing organizations available in the database, a link to a company code associated with the purchasing organizations and identifiers or names of each purchasing organization. According to the example of FIG. 2, each purchasing organization may be understood as one of the members of the purchasing organization category. Moreover, a purchasing organization identifier is an example of the member identifier.

In an alternative to the purchasing organization example described above, a country entity could define a countries category. Individual countries could be identified as members of the countries category in the customizing tables.

In another example, a VKORG domain (i.e. the domain with the name VKORG) is linked to a sales organization entity. The VKORG domain uses a customizing table with the name TVKO for storing member identifiers associated with a category of the VKORG domain. In this case, the category may be sales organizations and the member identifiers may identify individual sales organizations.

In some cases, it may be desirable to determine the database allocation of the category members defined by the purchasing organization entity. Moreover, identifiers of individual purchasing organizations can be identified by referring to the customizing tables linked to the EKORG domain 201. In a specific example, a determination of the database allocation of the purchasing organization entity may be provided as a calculation of the number of records in the database allocated to each member of the purchasing organization category.

Accordingly, the determining of the database allocation of the purchasing organization entity can begin by identifying the EKORG domain 201. Subsequently, at least one type definition linked to the EKORG domain 201 may be identified, for example, by using information in the data dictionary. In some cases, all type definitions linked to the EKORG domain 201 may be identified. After the type definition has been identified, the table fields using the type definition (i.e. the table fields referring to the type definition) may be identified.

Continuing with the example of FIG. 2, the EKORG type definition 203, the ADDI_EKORG type definition 205, and the HEKORG type definition 207 (type definitions 203-207) are identified using the links from the EKORG domain 201 to each of the corresponding type definitions in the data dictionary. The data dictionary may be implemented as table or database metadata, or as a distinct data structure. The data dictionary information may be understood to create a direct association between the EKORG type definition 203, the ADDI_EKORG type definition 205, the HEKORG type definition 207, and the EKORG domain 201. In other words, the links in the data dictionary directly associate the type definitions with the domain. The EKORG domain 201 may be linked to additional type definitions that are not depicted in FIG. 2. For example, in an implementation of SAP's enterprise resource planning (ERP) system the EKORG domain 201 is linked to 15 type definitions.

In the present example, the EKORG type definition 203, the ADDI_EKORG type definition 205, and the HEKORG type definition 207 are directly associated with EKORG domain 201.

Each type definition may refer to one or more table fields. According to the present example, the EKORG type definition 203 refers to a table field identifier 209, a table field identifier 211, and a table field identifier 213. In a specific implementation, all the type definitions of the EKORG domain 201 refer to fields in up to 400 different database tables. The table field identifier 209 represents all the fields in the table AFVC with the field name EKORG. The table identifier 211 represents all the fields in the table AUKO with the field name EKORG. In addition, the table identifier 213 represents all the fields in the table EKKO with the field name EKORG.

In some implementations, for each table field created, e.g. in the table AFVC, a field name for the table field is provided. Also, an existing type definition can be selected for the field. Alternatively, a new type definition can be created for the field. Creating the new type definition may involve assigning a domain, e.g. the EKORG domain 201, to the type definition. Accordingly, the new field refers to the selected or created type definition, and the type definition refers to the field. The type definition specifies the value range of the field, as defined by the domain. In the present example, the table fields identified by the table field identifier 209 refer to the EKORG type definition 203.

Continuing the example, table field identifier 215 is referred to by the type definition 205. The table identifier 215 represents all the fields in the table TWTFMA with the field name ADDIEKORG. The table identifiers 209-215 may represent header table fields, also referred to as header application table fields. A practice in data management may involve the distribution of data according to a header-detail table approach. According to the approach, a header table may represent one or more document headers (e.g. purchase orders), whereas all detail information associated with the header table is included in one or more detail tables. For example, the detail tables may include line items or elements associated with each purchase order defined in the corresponding header table. The header tables may be connected to the detail tables via a document number or an identification number. A table field including the document number or identification number is also referred to as a linking field. To keep the detail tables as small as possible, the relationship to the entity (e.g. the purchasing organization entity) may only be available in the header table. In other words, the detail tables do not refer to the entity since there is a reference to the entity in the header table. The header-detail table approach may improve performance when handling large volumes of table data.

Returning to the example of FIG. 2, the tables referred to by the type definitions 203-207 may be mainly header tables. Since the type definitions 203-207 are directly associated with the purchasing organization entity, the header table fields represented by the table field identifiers 209, 211, 213, and 215 are directly associated with the entity. In some cases, the tables identified by the table field identifiers 209, 211, 213, and 215 are using the type definitions 203 and 205 within the primary key of the corresponding table.

In addition, the EKORG domain 201 may be linked to one or more customizing tables. In other words, the EKORG domain 201 may be assigned to one or more further type definitions (not shown), and the further type definitions may refer to table fields in the one or more customizing tables. The customizing tables linked to the EKORG domain 201 may define options governing how the database is operated and how business processes are executed. Information regarding entities, category definitions, and members of categories may also be defined in the customizing tables. Thus, the customizing tables may define application and process specific configurations. The business object implementing the purchasing organization entity may be linked to the customizing tables via the EKORG domain 201. The process of determining the database allocation of the purchasing organization entity may involve evaluating the customizing tables that are linked to the business object implementing the entity, identifying the entity category, and identifying the members of the entity category in order to determine how many members are configured in the database system. The customizing tables may be linked to the EKORG domain 201 similarly to the header tables. Accordingly, member identifiers in the customizing tables can be identified by following links from the EKORG domain 201 to type definitions referring to fields in the customizing tables.

Returning to FIG. 2, the EKORG type definition 203 and the field name of the table field identifier 209 can be used to calculate the number of records related to each member of the category defined by the EKORG domain 201. In some cases, a select statement is used to calculate the number of records. In some implementations, links between domains, type definitions, and header table fields are determined at run time. Accordingly, the select statement may be referred to as a dynamic select statement since the corresponding links are identified at run time. A simple example of the dynamic select statement is as follows:

```
SELECT COUNT(*)
FROM (LS_ELEM_TAB-TABNAME)
INTO l_count
WHERE (WHERE_CLAUSE)
```

The string variables in the FROM condition and the WHERE clause may be filled in at run time as follows:

```
SELECT COUNT(*)
FROM TWTFMA
INTO l_count
WHERE ADDIEKORG = '0001'
```

The SELECT statement above can be used to determine the number of records in the TWTFMA table with the field name ADDIEKORG and a value of '0001'. In some implementations, the dynamic select statement generated during run time (as shown above) appears as if it were manually typed in ABAP code for each specific table.

Moreover, once the type definitions 203, 205, and 207 have been determined, the tables and table field names linked to the type definitions 203, 205, and 207 are identified. In one specific example, the type definition 203 is linked to 239 database tables, the type definition 205 is linked to only 1 table, and the type definition 207 is linked to 9 tables.

Results of executing the dynamic select statement may be summarized according to member identifier values 217-225. A member identifier value 217 shows that there are 219.299 directly associated header table fields allocated to purchasing organization identifier 0001. The directly associated header table fields are in the table (i.e. AFVC) and have the table field name (i.e. EKORG) identified by the table field identifier 209. The purchasing organization identifier 0001 may be understood as a value of the EKORG domain 201. Thus, the EKORG domain 201 may be understood to specify the data type character and the length four. In the present example, the purchasing organization identifier 0001 is a member identifier in the purchasing organization category. Each purchasing organization identified by a purchasing organization identifier may be understood as a member of the category.

A member identifier value 219 shows that there are 1.952 directly associated header table fields linked to purchasing organization identifier 1000. A member identifier value 221 shows that there are 640 directly associated header table fields allocated to purchasing organization identifier R300. A member identifier value 223 shows that there are 21.703 directly associated header table fields allocated to purchasing organization identifier R300. A member identifier value 225 shows that there are 13.203 directly associated header table fields allocated to purchasing organization identifier 1000. The fields associated with the member identifier values 217 and 219 appear in the table AFVC and have the field name EKORG. The fields associated with the member identifier value 221 appear in the table AUKO and have the field name EKORG. The fields associated with the member identifier values 223 and 225 appear in the table EKKO and have the field name EKORG. Accordingly, determining the database allocation of the purchasing organization entity may involve determining the database allocation of the members identified by identifiers '0001', '1000', and 'R300'.

The identified tables, e.g. AFVC, AUKO, EKKO, TWTFMA, etc., are usually header tables. According to the header-detail table approach described above, only a small amount of data stored within the database is stored in header tables. The bulk of the data in the database may be stored in detail tables that are linked to the header tables, e.g. via linking fields. In particular, it is not usually possible to determine the database allocation of the purchasing organization entity in detail tables merely by following the links to table fields directly associated with the purchasing organization entity (i.e. tables linked to the EKORG domain 201). Accordingly, further steps may be performed in order to determine detail table fields indirectly associated with the purchasing organization entity, i.e. where there is no link between the EKORG domain 201 and type definitions used by the detail table fields.

Table fields directly associated with the EKORG domain 201 may contain a member identifier. These table fields may be referred to as directly associated header table fields. For example, 219.229 header table fields represented by the table field identifier 209 contain the purchasing organization identifier "0001".

In order to determine the detail table fields indirectly associated with the purchasing organization entity, the primary keys of the determined header tables and the fields of the header tables that have data in them may be evaluated. In particular, linking fields that appear in both a header table and the detail table may be used.

In some cases, each linking field in the header table is unique. In addition, it may be that a linking field appearing in the header table appears multiple times in one or more detail tables connected to or linked to the header table.

Moreover, the approach to determine the detail table fields indirectly associated with the entity may be a reverse of the approach used to determine the header table fields directly associated with the entity. In particular, linking fields in the same row as the determined header table fields may be used as a starting point. Then, the type definitions referred to by the linking fields may be determined. The type definitions referred to by the linking fields may be understood as indirectly associated type definitions since they are not linked to the domain that is linked to the entity.

In a specific example, the linking fields may refer to at least one type definition that is linked to a domain specifying a data type of integer and a length of ten digits. The domain of the linking field may be referred to as an indirectly associated domain since the domain of the linking field is not linked to the purchasing organization entity (i.e. there is no reference in the data dictionary connecting the indirectly associated domain to the purchasing organization entity). Thus, the domain of the linking field is different from the EKORG domain 201 linked to the purchasing organization entity. After the indirectly associated domain has been identified, other indirectly associated type definitions linked to the indirectly associated domain can also be identified. The newly identified indirectly associated type definitions may in turn refer to additional detail table fields that are indirectly associated with the entity. Thus, a process similar to the one performed with the domain directly associated with the entity may be performed with the domain of the linking field in order to determine further fields indirectly associated with the entity.

The links between header tables and detail tables are determined by figuring out the type definitions and domains used by both types of table. Each linking field that appears in both a header table and its corresponding detail tables is normally part of the primary key of both the header table and the detail tables. The linking field may be a numeric field such as a document number or an identifier. In addition, the linking field may be part of the primary key of the header table and the detail table for performance reasons. Advantageously, a search for linking fields can be restricted to the primary key of the identified header tables, thereby reducing the table fields to be analyzed.

It is possible that the linking field is determined by an estimation. In particular, it is possible that the links between header tables and detail tables are not documented or identified within the database. In some cases, there may be only a few experienced users who know how tables are linked to each other based upon experience. In other cases, only the developer using and storing data in different tables knows how the tables are connected. Thus, the links between each header table and its corresponding detail tables may be determined by checking which type definitions or domains are part of the header table and could indicate a linking field such as a document number or identifier. For example, the linking fields may be identified by searching records containing determined header table fields for all integers with a length of more than ten digits. The type definitions and domains associated with the determined linking fields can then be used to determine other tables that are located in the same application area. Domains and type definitions may be stored as metadata for each individual table.

In view of the directly associated header tables and the detail tables that may be linked to those header tables, additional levels of analysis can be performed. The more levels of analysis that are performed, the more precise the result will be. A good indication of the database allocation of the entity can be obtained merely by identifying directly associated header tables and indirectly associated detail tables. For example, if 30 percent of a header table contains entries for the purchasing organization with identifier 0001, it is likely that the ratio of the 30 percent also applies to the detail tables connected to the header table.

However, for more precise analysis, identified the header tables and detail tables can be joined based on linking fields. In particular, a second level of analysis can be performed by creating a second set of dynamic select statements. Each member of the second set of dynamic select statements includes a join condition involving two possibly linked tables. Similar to the dynamic selection statements described above, elements of the join condition can be filled in at run time. The following, written in ABAP, is an example of join condition that can be used in level 2 analysis:

```
SELECT (SELECT_CLAUSE)
FROM (FROM_CLAUSE)
INTO (VAL, VALUES)
ENDSELECT.
```

The SELECT clause, FROM clause, and INTO clause can be filled in at run time as follows:

```
SELECT count(*)
FROM HEADER_TABLE as head inner join
    LINE_TAB as line on head~DOC_ID = line~DOC_ID
INTO l_count.
```

In some cases, the join condition generated during run time (as shown above) appears as if it were manually typed in ABAP code for each table.

The join condition can be used to search for one of the member identifiers defined in the customizing table linked to the EKORG entity. The join condition then determines all the linking fields for the member in the header table. Finally, the join condition determines how many indirectly associated detail table fields are linked to each linking field in the header table. Typically, for every entry in the header table there are a plurality of entries in the detail table. This procedure may be carried out for all possibly linked tables using an iterative approach. In particular, a set of possible linked tables may consist of a header table and a detail table. Additional levels of analysis may be performed in order to find further tables linked to the identified detail tables. There may be more than five levels of analysis. Advantageously, the same approach of doing one or two levels of analysis is also valid for further levels of analysis.

Once the fields of each table linked to specific category members are determined, the ratio of the number of records associated with a particular category member to the total number of records in the corresponding table can be calculated. This ratio can then be used for calculating the database allocation of the member in megabytes (MB) using the total size of the table in the database and applying a ratio of the records associated with the member to the total number of records in the table. The calculated sizes for each table can be added up to determine the total database allocation for the category member.

Returning to the example, histograms can be created for all tables that are linked to the EKORG domain 201. Each of the 400 tables associated with the EKORG domain 201 can be considered as a worklist for processing histograms. Also, the identified database field names can be used to extract a number of records associated with each purchasing organization identified. One histogram can be created from each table. The histograms split the whole content of a table into multiple portions, one for each purchasing organization. The interim result will contain the purchasing organization identifier as well as the number of records associated with the purchasing organization identifier within this specific table and the ratio of the associated records to the total number of records in the table.

A histogram for the AFVC table referred to in connection with FIG. 2 could be generated using the following simplified data set:

| Type Definition | Purchasing Organization | Records | Size (in MB) |
| --- | --- | --- | --- |
| EKORG | 1 | 14871 | 7224 |
| EKORG | 2 | 3 | 1 |
| EKORG | 11 | 3 | 1 |
| EKORG | 100 | 1 | 0 |
| EKORG | 143 | 3 | 1 |
| EKORG | 1000 | 49 | 24 |
| EKORG | 1234 | 22 | 11 |
| EKORG | 3000 | 8 | 4 |
| EKORG | 4444 | 2 | 1 |
| EKORG | AA10 | 1 | 0 |
| EKORG | ASKM | 1 | 0 |
| EKORG | C100 | 1 | 0 |
| EKORG | CB01 | 4 | 2 |
| EKORG | DL05 | 2 | 1 |
| EKORG | ED01 | 2 | 1 |
| EKORG | FIN2 | 3 | 1 |
| EKORG | FIWS | 1 | 0 |
| EKORG | I879 | 1 | 0 |
| EKORG | IN47 | 2 | 1 |
| EKORG | IWS0 | 88 | 43 |
| EKORG | LADE | 2 | 1 |
| EKORG | RGJ2 | 1 | 0 |

Thus, according to the data set above, the purchasing organization with type definition EKORG and member identifier "1" (i.e. individual purchasing organization 1) has 14.871 records allocated to it in the table named AFVC. The records require 7.224 megabytes of storage space.

The method described above can be applied on databases storing any kind of data, such as business data or technical data. The process of determining the database allocation of the entity may be particularly useful when applied to a database which stores data for a long period of time, e.g. more than one week or more than one month. Moreover, the invention can be used in any environment where there is a database that deals with relations.

The number of tables to be analyzed increases with each level of analysis. Moreover, since each level of analysis after level 2 requires the use of dynamic join statements, the load on the database will increase as well. In other words, the more levels of analysis to be performed, the greater the load on the database. In some cases, depending on the entity, 5 levels of analysis might end up counting all the fields in the database. Generally, either 2 or 3 levels of analysis provide at least a sufficient ratio between database resource consumption and the reliability of the result.

Figure 3:
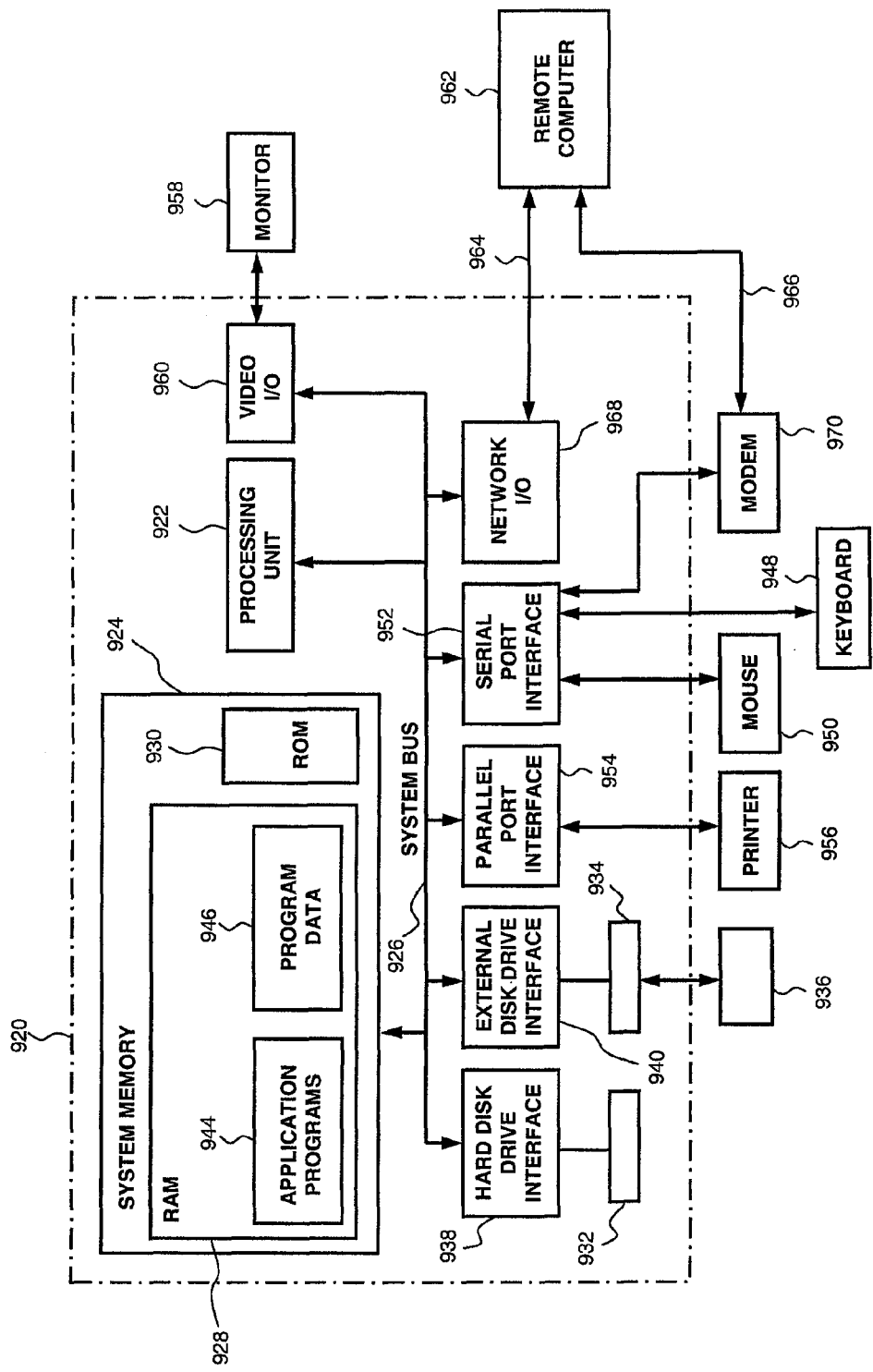
FIG. 3 depicts a general purpose computer.

FIG. 3 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for determining a database allocation of an entity, as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 and 2.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB).

Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 3 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 3 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the determining of a database allocation of an entity (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for determining a database allocation of an entity.

What is claimed is:

1. A computer-implemented method for determining a database allocation of an entity, the method comprising:
 identifying a domain directly associated with the entity;
 determining at least one header table field directly associated with the entity by identifying a directly associated type definition linked to the directly associated domain, wherein the directly associated type definition refers to the header table field, wherein each header table field is in a corresponding header table;
 determining at least one detail table field indirectly associated with the entity, wherein each detail table field is in a corresponding detail table, the determining comprising:
 determining a linking field that is in the same header table as the header table field;
 identifying a first indirectly associated type definition indirectly associated with the entity, wherein the first indirectly associated type definition refers to the linking field, wherein the first indirectly associated type definition is linked to an indirectly associated domain that is not directly associated with the entity;

determining, using the first indirectly associated type definition, the detail table field, wherein the first indirectly associated type definition refers to the detail table field;

calculating the number of records allocated to the entity, each calculated record including the determined header table field or the determined detail table field;

wherein each domain defines a value range;

wherein each type definition linked to a corresponding domain specifies the value range of the corresponding domain for each field that refers to the type definition.

2. The computer-implemented method of claim 1, wherein determining the detail table field using the first indirectly associated type definition further comprises determining all the detail table fields referred to by the first indirectly associated type definition.

3. The computer-implemented method of claim 1, wherein identifying the directly associated type definition linked to the directly associated domain further comprises identifying all the directly associated type definitions linked to the directly associated domain, wherein determining the header table field directly associated with the entity comprises determining all the header table fields directly associated with the entity, wherein each determined header table field is referred to by one of the identified directly associated type definitions; and wherein determining the linking field further comprises determining all the linking fields in the corresponding header tables of the determined header table fields.

4. The computer-implemented method of claim 1, wherein identifying the first indirectly associated type definition further comprises identifying all subsequent indirectly associated type definitions linked to the indirectly associated domain, wherein at least one of the subsequent indirectly associated type definitions does not refer to the linking field;

wherein determining the at least one detail table field comprises:

determining, using the first indirectly associated type definition and the subsequent indirectly associated type definitions, all the detail table fields indirectly associated with the entity, wherein at least one of the determined detail table fields is identical to the linking field.

5. The computer-implemented method of claim 1, wherein the entity defines a category, the method further comprising:

identifying a customizing table linked to the entity; and identifying at least one member of the category in the customizing table;

wherein the header table field is linked to the identified member; and wherein determining the database allocation of the entity comprises determining the database allocation of the member.

6. The computer-implemented method of claim 5, wherein identifying the at least one member comprises identifying all the members of the category in the customizing table;

wherein determining the database allocation of the member further comprises determining the database allocation of all the identified members;

wherein each directly associated header table field is linked to one of the identified members;

wherein each indirectly associated detail table field is linked to one of the identified members by the header table field used to determine the corresponding indirectly associated detail field;

wherein calculating the number of records allocated to the entity comprises calculating the number of records linked to each member, the number of calculated records comprising:

the number of records in each header table including a header table field linked to the member; and the number of records in each detail table including a detail table field linked to the member; the method further comprising:

generating a histogram for the table, wherein the calculated number of records for each member is represented by a corresponding bin in the histogram.

7. The computer-implemented method of claim 1, wherein determining the linking field comprises evaluating the primary key of the corresponding header table.

8. The computer-implemented method of claim 1, wherein the linking field has an integer data type and a length of more than 10 digits.

9. The computer-implemented method of claim 1, wherein the directly associated domain is not linked to any type definition referred to by one of the determined detail table fields.

10. The computer-implemented method of claim 1, wherein the directly associated domain is linked to the entity in a data dictionary;

wherein the indirectly associated domain is not linked to the entity in the data dictionary.

11. The computer-implemented method of claim 1, wherein the indirectly associated domain is indirectly associated with the entity by the first indirectly associated type definition.

12. The computer-implemented method of claim 1, wherein, for each header table and each detail table the method further comprises determining the ratio of the calculated number of records in the corresponding table to the total number of records in the corresponding table.

13. The computer-implemented method of claim 1, further comprising:

executing a join operation on one directly associated header table and one indirectly associated detail table;

determining, via the join operation, all records in the directly associated header table linked to the identified member;

all the linking fields in the directly associated header table;

for each determined linking field, the number of records in the indirectly associated detail table with a detail table field that is linked to the corresponding linking field;

verifying the calculated number of detail table fields against the detail table fields determined via the join operation.

14. A computer program product comprising computer-readable instructions, which, when loaded and executed on a computer system, cause the computer system to perform the method of claim 1.

15. A database system operable to determine a database allocation of an entity, the system comprising:

a domain identifier operable to identify a domain directly associated with the entity;

a header field determiner operable to determine at least one header table field directly associated with the entity by identifying a directly associated type definition linked to the directly associated domain, wherein the directly associated type definition refers to the header table field, wherein each header table field is in a corresponding header table;

a detail field determiner operable to determine at least one detail table field indirectly associated with the entity, wherein each detail table field is in a corresponding detail table, the detail field determiner operable to:

determine a linking field that is in the same header table as the header table field;

identify a first indirectly associated type definition indirectly associated with the entity, wherein the first indirectly associated type definition refers to the linking field, wherein the first indirectly associated type definition is linked to an indirectly associated domain that is not directly associated with the entity;

determine, using the first indirectly associated type definition, the detail table field, wherein the first indirectly associated type definition refers to the detail table field;

a field calculator operable to calculate the number of records allocated to the entity, each calculated record including the determined header table field or the determined detail table field;

wherein each domain defines a value range;

wherein each type definition linked to a corresponding domain specifies the value range of the corresponding domain for each field that refers to the type definition.

* * * * *